(12) United States Patent
Yajima

(10) Patent No.: US 11,932,100 B2
(45) Date of Patent: Mar. 19, 2024

(54) VALVE DEVICE

(71) Applicant: PIOLAX, INC., Kanagawa (JP)

(72) Inventor: Kazuki Yajima, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 58 days.

(21) Appl. No.: 17/784,906

(22) PCT Filed: Dec. 17, 2020

(86) PCT No.: PCT/JP2020/047250
§ 371 (c)(1),
(2) Date: Jun. 13, 2022

(87) PCT Pub. No.: WO2021/132034
PCT Pub. Date: Jul. 1, 2021

(65) Prior Publication Data
US 2023/0018794 A1    Jan. 19, 2023

(30) Foreign Application Priority Data
Dec. 24, 2019  (JP) .................................. 2019-232761

(51) Int. Cl.
*F16K 24/04* (2006.01)
*B60K 15/03* (2006.01)

(52) U.S. Cl.
CPC ............ *B60K 15/03* (2013.01); *F16K 24/042* (2013.01); *B60K 2015/03296* (2013.01)

(58) Field of Classification Search
CPC ........... B60K 2015/03289; B60K 2015/03296; B60K 15/03519; F16K 17/12;
(Continued)

(56) References Cited

U.S. PATENT DOCUMENTS 7,913,671 B2 * 3/2011 Arnalsteen ............ F16K 17/194
137/202

FOREIGN PATENT DOCUMENTS

| CN | 105864477 A | * | 8/2016 | ............. F16K 17/36 |
| CN | 112128445 A | * | 12/2020 | ......... F02M 37/0023 |

(Continued)

OTHER PUBLICATIONS

Feb. 2, 2021, International Search Report issued for related PCT application No. PCT/JP2020/047250.
(Continued)

*Primary Examiner* — Hailey K. Do
(74) *Attorney, Agent, or Firm* — Paratus Law Group, PLLC

(57) ABSTRACT

There is provided a valve device including: a housing in which a valve chamber is provided on a lower side and a ventilation chamber is provided on an upper side via a partition wall, the partition wall being formed with a valve hole; a float valve; and a pressure adjusting valve. An accommodation portion is provided in a protruding manner from a surface of the partition wall. An accommodating space configured to accommodate the pressure adjusting valve is formed on an inner side of the accommodation portion, and an outer space is formed on an outer side of the accommodating space. The accommodation portion is formed with an opening through which the accommodating space and the outer space communicate with each other.

2 Claims, 10 Drawing Sheets

(58) Field of Classification Search
CPC .... F16K 15/023; F16K 24/042; F16K 24/044; F16K 31/20; F16K 31/22; F02M 37/00
See application file for complete search history.

(56) References Cited

FOREIGN PATENT DOCUMENTS

| | | | | | |
|---|---|---|---|---|---|
| CN | 112344061 A | * | 2/2021 | ............. | B60K 15/03 |
| JP | 2009-079752 A | | 4/2009 | | |
| JP | 2009-168134 A | | 7/2009 | | |
| KR | 10-0956963 B1 | | 5/2010 | | |

OTHER PUBLICATIONS

Feb. 2, 2021, International Search Opinion issued for related PCT application No. PCT/JP2020/047250.

Nov. 2, 2021, International Preliminary Report on Patentability issued for related PCT application No. PCT/JP2020/047250.

* cited by examiner

VALVE DEVICE

CROSS REFERENCE TO PRIOR APPLICATION

This application is a National Stage Patent Application of PCT International Patent Application No. PCT/JP2020/047250 (filed on Dec. 17, 2020) under 35 U.S.C. § 371, which claims priority to Japanese Patent Application No. 2019-232761 (filed on Dec. 24, 2019), which are all hereby incorporated by reference in their entirety.

TECHNICAL FIELD

The present invention relates to a valve device which is attached to a fuel tank of an automobile or the like and which can adjust pressure in the fuel tank.

BACKGROUND ART

For example, a fuel tank of an automobile is provided with a pressure adjusting valve that prevents rupture or the like of the fuel tank by causing fuel vapor to flow out to the outside when the pressure in the fuel tank increases to a predetermined value or more, and that prevents collapse or the like of the fuel tank by causing outside air to flow in from the outside of the fuel tank when the pressure in the fuel tank decreases to a predetermined value or less than the outside air pressure.

As a valve device provided with such a pressure adjusting valve described above, for example. Patent Literature 1 below describes a valve case provided with, via a partition wall, a float chamber communicating with the inside of a fuel tank on a lower side and a ventilation chamber communicating with the outside of the tank on an upper side, a float valve disposed so as to be movable up and down in the float chamber; a check valve (pressure adjusting valve) disposed in the ventilation chamber; and a communication port with a lower surface peripheral edge forming a first valve seat which the float valve comes into contact with and separates from and an upper surface peripheral edge forming a second valve seat which the check valve comes into contact with and separates from, in which a tubular wall is formed on an upper surface of the partition wall, and the check valve has a polygonal plate shape made of a metal material such as stainless steel, is disposed so as to be movable up and down on an inner side of the tubular wall, and is normally in contact with the second valve seat.

When the pressure in the fuel tank increases, fluid such as fuel vapor flows into the ventilation chamber through the communication port, pushes up the check valve, and the fluid such as fuel vapor is discharged. On the other hand, when the pressure in the fuel tank decreases, the check valve is lowered, but even when the tank internal pressure decreases, the outflow of fuel vapor or the like from the communication port is not completely eliminated. In this case, if the check valve has a simple plate shape, the check valve is pushed up by the fuel vapor or the like and is difficult to be lowered. Therefore, a plurality of through holes are formed in the check valve, and the fuel vapor or the like is caused to flow out from these through holes to increase valve closing pressure of the check valve (pressure when the raised check valve is closed again to close the communication port).

CITATION LIST

Patent Literature

Patent Literature 1: JP-A-2009-168134

SUMMARY OF INVENTION

Technical Problem

In the valve device of Patent Literature 1, as described above, since the check valve is formed with a plurality of through holes, the processing cost is correspondingly increased, and the manufacturing cost of the valve device is disadvantageously increased.

Therefore, an object of the present invention is to provide a valve device in which valve closing pressure of a pressure adjusting valve can be increased while the manufacturing cost is reduced.

Solution to Problem

In order to achieve the above object, a valve device according to the present invention includes: a housing in which a valve chamber is provided on a lower side and a ventilation chamber is provided on an upper side via a partition wall, the valve chamber communicating with an inside of a fuel tank, the ventilation chamber communicating with an outside of the fuel tank, and the partition wall being formed with a valve hole through which the valve chamber and the ventilation chamber communicate with each other; a float valve accommodated in the valve chamber so as to be movable up and down and configured to open and close the valve hole; and a pressure adjusting valve configured to adjust pressure and accommodated in the ventilation chamber so as to be movable up and down, in which a first valve seat which the pressure adjusting valve is to come into contact with and is to separate from is formed from a peripheral edge of the valve hole on a side of the ventilation chamber, and a second valve seat which the float valve is to come into contact with and is to separate from is formed from a peripheral edge of the valve hole on a side of the valve chamber, an accommodation portion is provided in a protruding manner from a surface of the partition wall on the side of the ventilation chamber, when the accommodation portion is viewed from an axial direction of the pressure adjusting valve, an accommodating space configured to accommodate the pressure adjusting valve is formed on an inner side of the accommodation portion, and an outer space is formed on an outer side of the accommodating space, and the accommodation portion is formed with an opening through which the accommodating space and the outer space communicate with each other.

Advantageous Effects of Invention

According to the present invention, since the pressure adjusting valve accommodating portion surrounding the pressure adjusting valve is formed with the opening through which the accommodating space and the outer space communicate with each other, when internal pressure of the fuel tank decreases, the fluid that pushes up the pressure adjusting valve is easily released from the accommodating space to the outer space through the opening, and valve closing pressure of the pressure adjusting valve can be increased. Therefore, even when the pressure in the fuel tank is high, the pressure adjusting valve can be easily closed. In addition, since it is not necessary to form a hole in the pressure adjusting valve for increasing the valve closing pressure of the pressure adjusting valve, the manufacturing cost of the valve device can be reduced.

DESCRIPTION OF EMBODIMENTS

Hereinafter, an embodiment of a valve device according to the present invention will be described with reference to the drawings. In the following description, "fuel" means liquid fuel (including fuel droplets), and "fuel vapor" means evaporated fuel. In addition, the valve device in this embodiment is a valve device for a fuel tank to be attached to the fuel tank of a vehicle such as an automobile.

Figure 1:
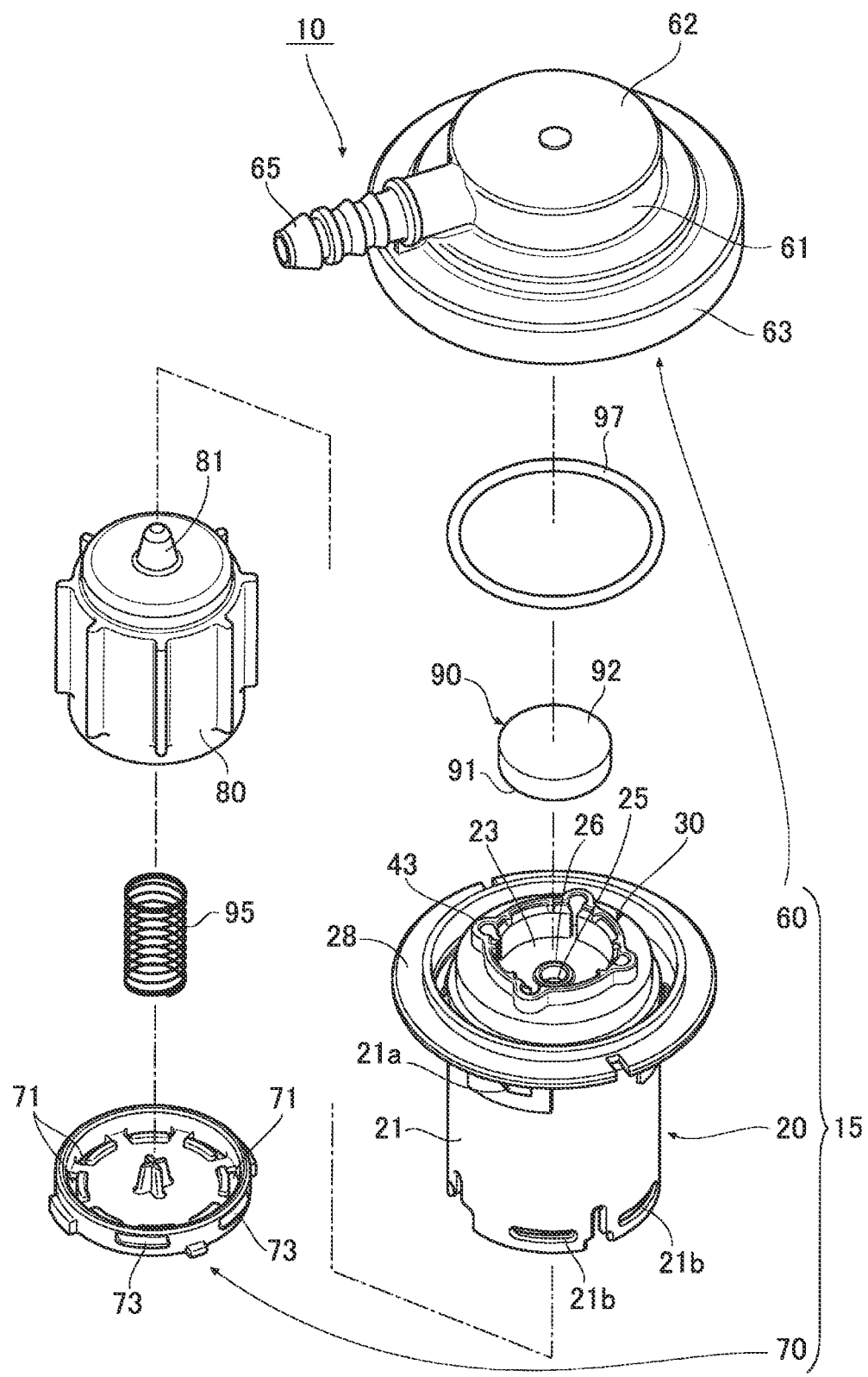
FIG. 1 is an exploded perspective view showing a valve device according to an embodiment of the present invention.

As shown in FIG. 1, a valve device 10 according to the present embodiment has a substantially tubular shape and includes a housing 15. The housing 15 includes a housing main body 20 provided with a partition wall 23 on an upper side, a cap 70 mounted on a lower side of the housing main body 20, and a cover 60 mounted on the upper side of the housing main body 20.

Figure 3:
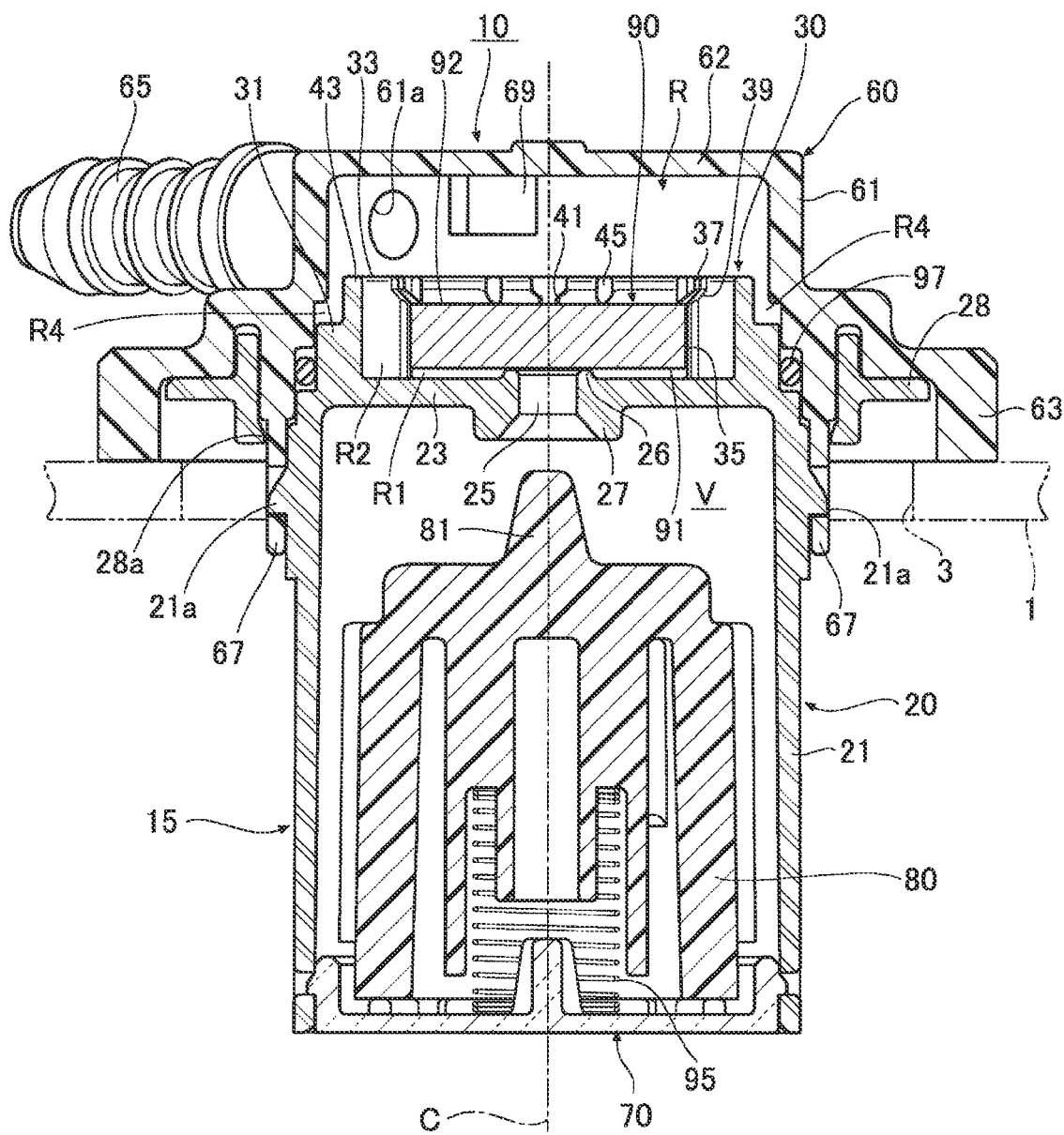
FIG. 3 is a cross-sectional view taken along a line A-A in FIG. 2.

As shown in FIGS. 1 and 3, the housing main body 20 has a peripheral wall 21 with a substantially cylindrical shape, and the partition wall 23 having a substantially disk shape is disposed on the upper side of the peripheral wall 21. The partition wall may be provided, for example, in the peripheral wall 21 of the housing main body 20 on the way in an axial direction, and the shape of the partition wall may be simply a disk shape, or may be a shape in which a central portion protrudes in a tubular shape and a wall portion (shoulder wall portion) provided at a peripheral edge portion has a stepped shape. The position and shape of the partition wall are not particularly limited.

Further, a flange portion 28 extending outward is formed from an upper outer peripheral edge of the peripheral wall 21. A plurality of insertion holes 28a are formed on an inner peripheral side of the flange portion 28 (see FIG. 5). Further, locking protrusions 21a are provided in a protruding manner at positions which are close to the upper side of the peripheral wall 21 and which are aligned with the insertion holes 28a (see FIG. 5). A plurality of locking holes 21b are formed on a lower side of the peripheral wall 21. Although not particularly shown, a plurality of through holes are formed in the peripheral wall 21.

Figure 2:
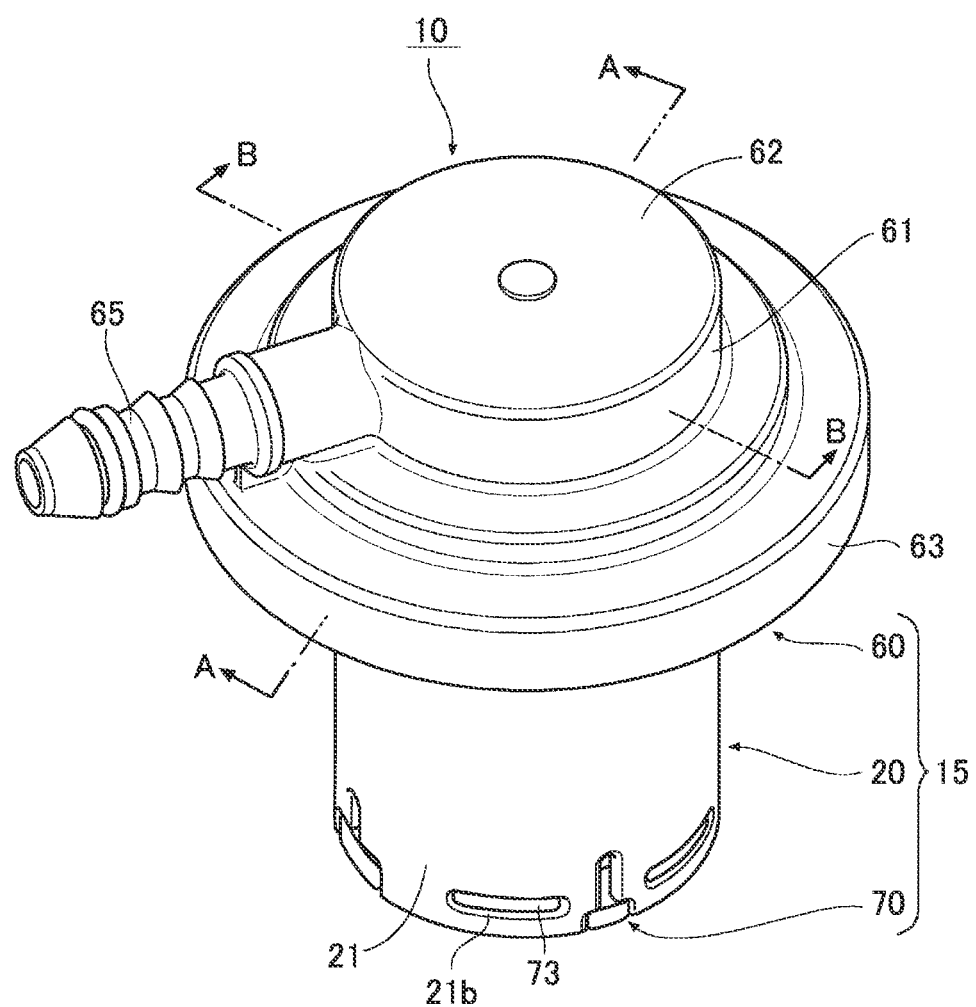
FIG. 2 is a perspective view of the valve device.

The cap 70 has a plurality of through holes 71, and a plurality of locking claws 73 are formed on an outer periphery of the cap 70. By locking each locking claw 73 of the cap 70 to each locking hole 21b of the housing main body 20, the cap 70 is mounted below the housing main body 20 (see FIG. 2). As a result, as shown in FIG. 3, a valve chamber V communicating with the inside of the fuel tank 1 is formed at the lower side of the housing via the partition wall 23. In the valve chamber V, a float valve 80 provided with a valve head 81 on the upper side is disposed so as to be movable up and down via an urging spring 95 (see FIG. 3).

The cover 60 has a substantially hat shape, and includes a substantially cylindrical peripheral wall 61, a ceiling wall 62 closing an upper portion of the peripheral wall 61, and a flange portion 63 annularly extending from a lower peripheral edge of the peripheral wall 61. A fuel vapor discharge port 61a (see FIG. 3) is formed at a predetermined position of the peripheral wall 61, and a fuel vapor pipe 65 having a substantially cylindrical shape extends outward from an outer peripheral edge portion of the fuel vapor discharge port 61a. A tube (not shown) that communicates with a canister (not shown) or the like disposed outside the fuel tank is connected to the fuel vapor pipe 65. Further, a plurality of locking pieces 67 extend from a lower end portion of the peripheral wall 61 (see FIG. 3). As shown in FIG. 3, the valve device 10 can be attached to the fuel tank 1 by fixing a lower end portion of the flange portion 63 to a front peripheral edge of an attachment hole 3 of the fuel tank 1 by welding or the like.

Figure 8:
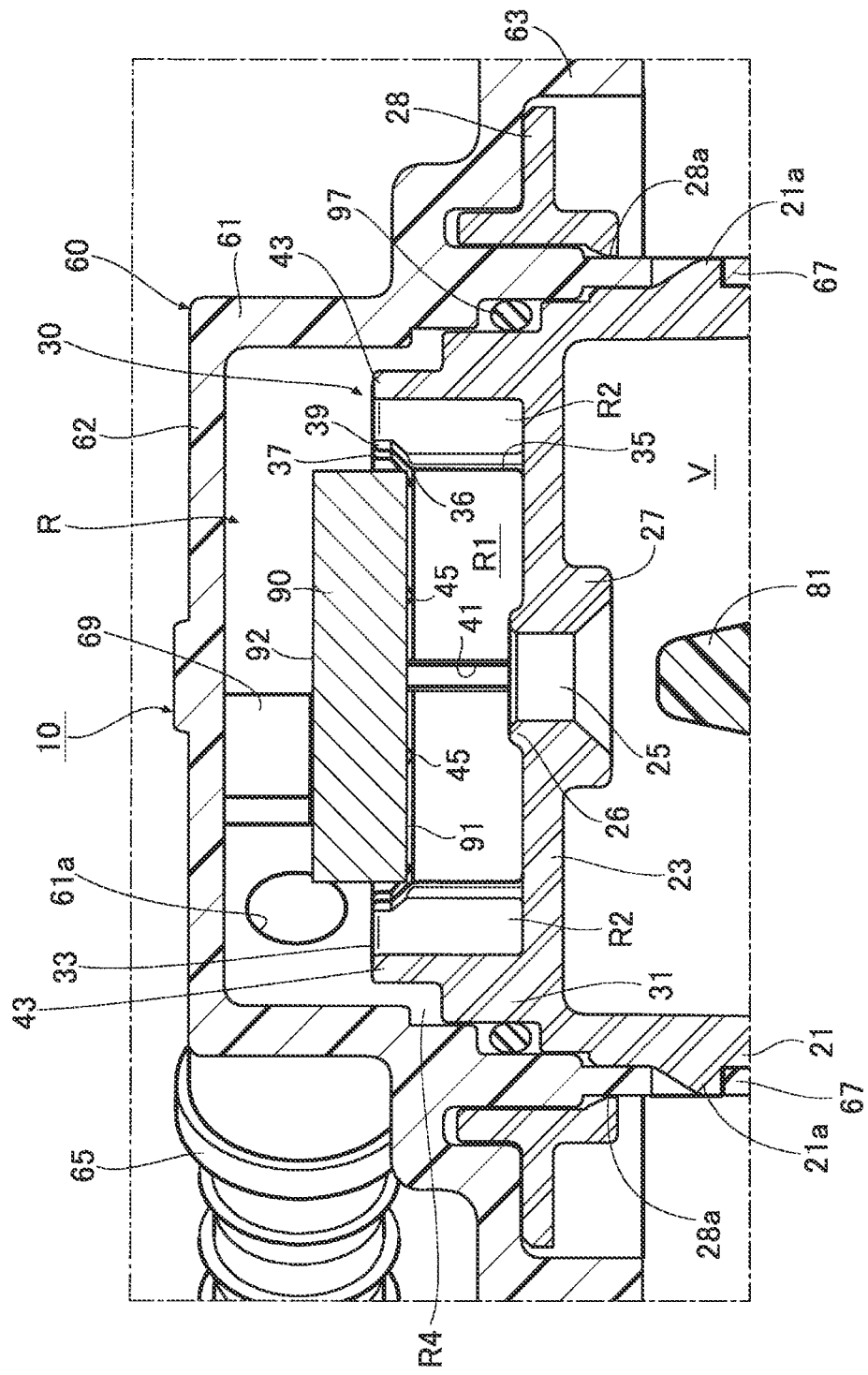
FIG. 8 is an enlarged cross-sectional view of a main part of the valve device in a state where the pressure adjusting valve is raised to the maximum and the valve hole is opened.

Further, as shown in FIG. 3, a position regulating portion 69 in the form of a protruding piece is vertically provided at a predetermined length from an inner surface of the ceiling wall 62. As shown in FIG. 8, a lower end of the position regulating portion 69 is contactable with a front surface 92 of a pressure adjusting valve 90, which will be described later, and regulates a further rise of the pressure adjusting valve 90. That is, the position regulating portion 69 defines a maximum rising position (full stroke position) of the pressure adjusting valve 90.

Then, in a state where a seal ring 97 is mounted on the upper outer periphery of the peripheral wall 21 of the housing main body 20, the cover 60 is covered from above to sandwich the seal ring 97, and each locking piece 67 of the cover 60 is inserted from the insertion hole 28a of the housing main body 20 and locked to each locking protrusion 21a correspondingly, so that the cover 60 is attached to the upper side of the housing main body 20. As a result, via the partition wall 23, a ventilation chamber R communicating with an outside of the fuel tank is formed above the partition wall 23 (see FIG. 3).

Figure 6:
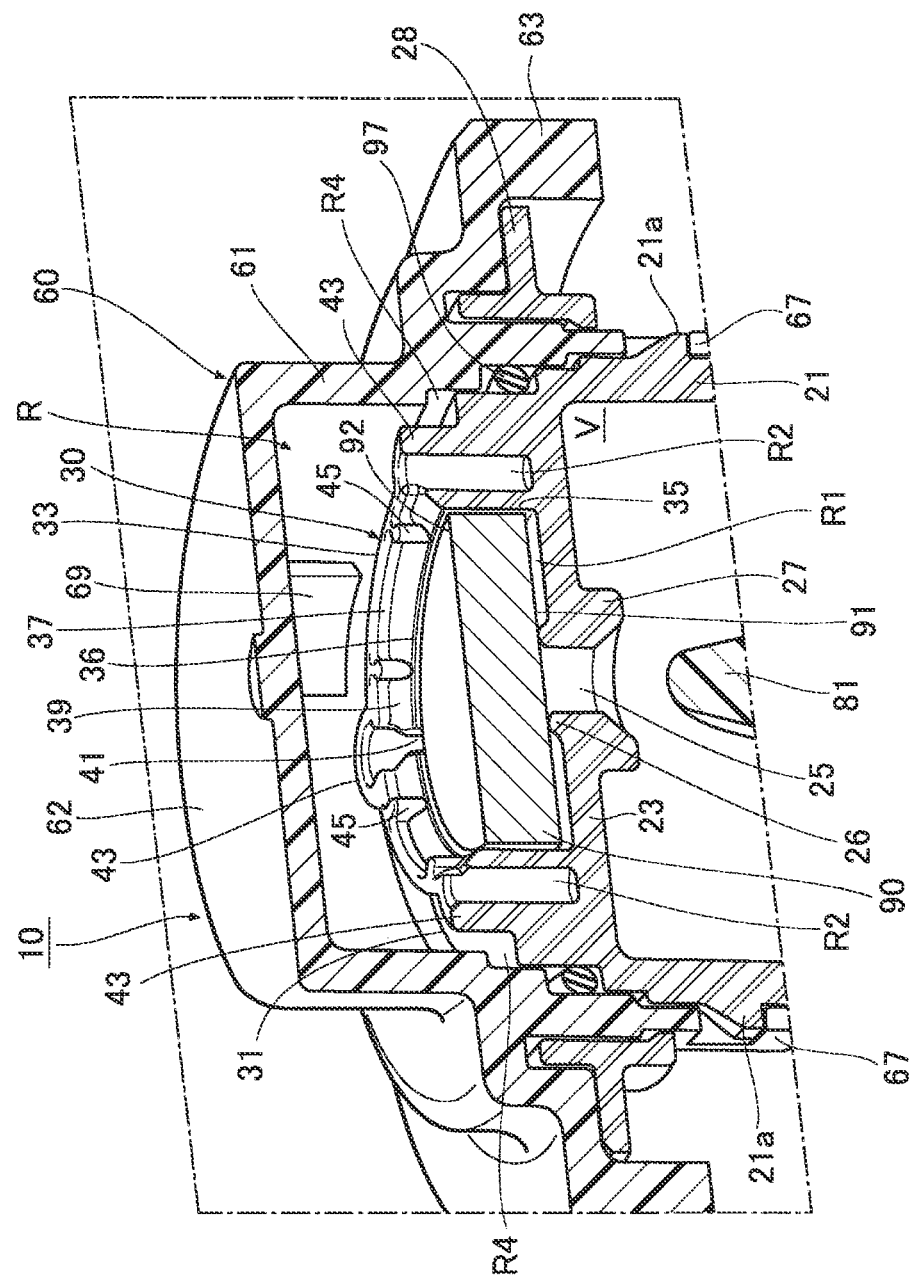
FIG. 6 is an enlarged cross-sectional perspective view taken along a line B-B in FIG. 2.
Figure 7:
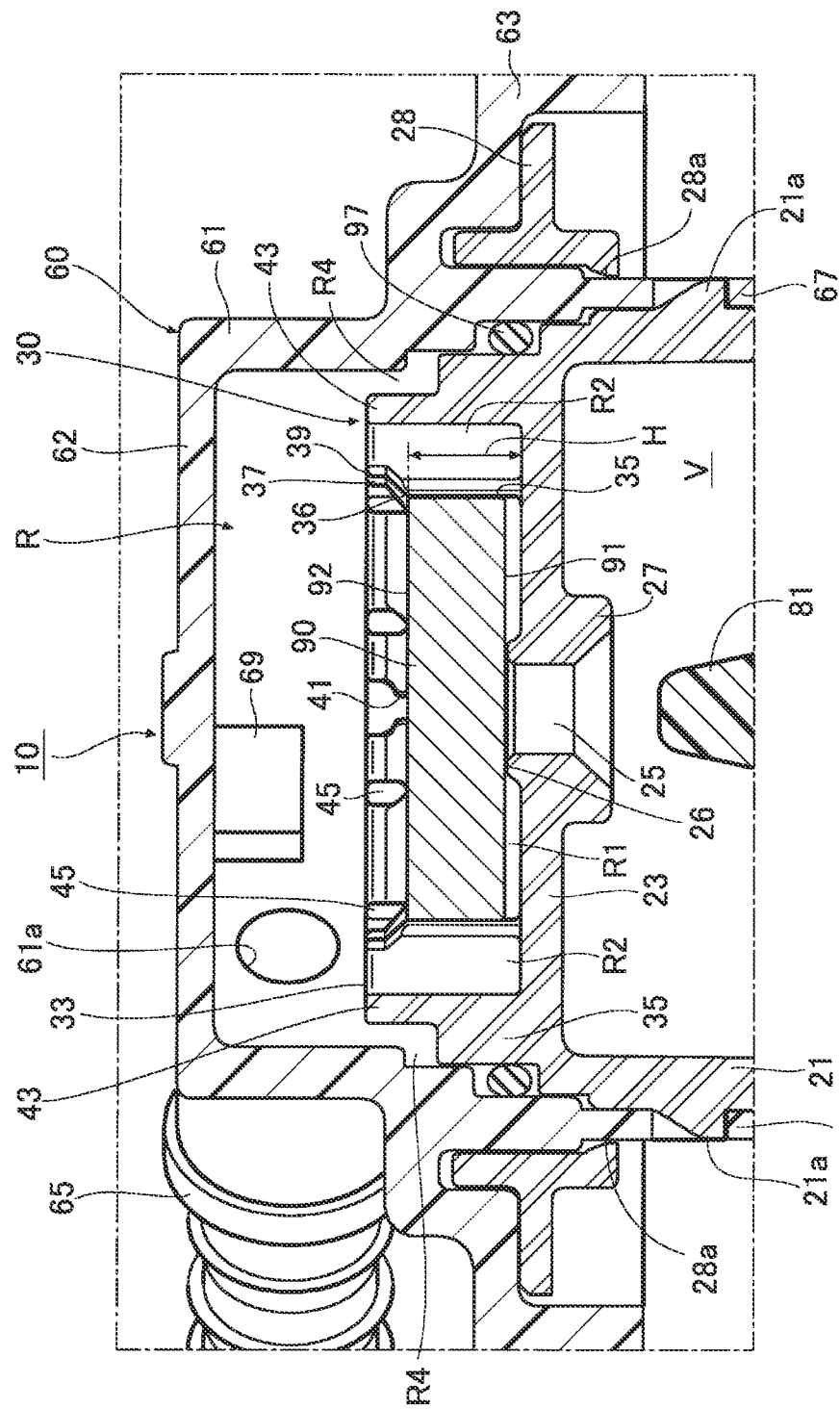
FIG. 7 is an enlarged cross-sectional view of a main part of the valve device in a state where a pressure adjusting valve is lowered and comes into contact with a first valve seat so as to close a valve hole.

The pressure adjusting valve 90 for adjusting the pressure of the fuel tank 1 is accommodated in the ventilation chamber R so as to be movable up and down (see FIGS. 7 and 8). As shown in FIGS. 1 and 6, the pressure adjusting valve 90 (hereinafter, also simply referred to as "adjusting valve 90") in this embodiment has a disk shape with a predetermined thickness. The adjusting valve 90 is not formed with a through hole or the like penetrating in a thickness direction thereof. The shape of the pressure adjusting valve is not particularly limited, and in addition to the disk shape, the pressure adjusting valve may have a rectangular, pentagonal, hexagonal, or polygonal plate shape, a substantially elliptical or substantially oval plate shape, or the like.

A material for the adjusting valve 90 is not particularly limited as long as it is a material that is not easily deformed or corroded by fuel vapor. For example, a metal material such as an iron-based metal including stainless steel (SUS304 or the like), a Ti-based alloy, a Cu-based alloy, and an Al-based alloy, a ceramic material, or a synthetic resin material can be used. The adjusting valve 90 of the present embodiment is made of stainless steel. As shown in FIG. 7, a surface of the adjusting valve 90 facing a first valve seat 26 is referred to as a back surface 91, and a surface opposite to the back surface 91 is referred to as the front surface 92.

The adjusting valve 90 is urged in a valve seat direction only by its own weight, and as shown in FIG. 7, the back surface 91 of the adjusting valve 90 is normally in contact with the first valve seat 26, which will be described later, to close a valve hole 25.

Returning to the description of the housing main body 20, as shown in FIG. 3, at the center of the partition wall 23, the valve hole 25 having a circular hole shape is formed so as to penetrate the partition wall 23. The valve chamber V and the ventilation chamber R communicate with each other through the valve hole 25. The first valve seat 26 is provided to protrude upward from a peripheral edge of the valve hole 25 on the ventilation chamber R side. As shown in FIGS. 7 and 8, the adjusting valve 90 is brought into contact with and separated from the first valve seat 26 to open and close the valve hole 25.

Figure 5:
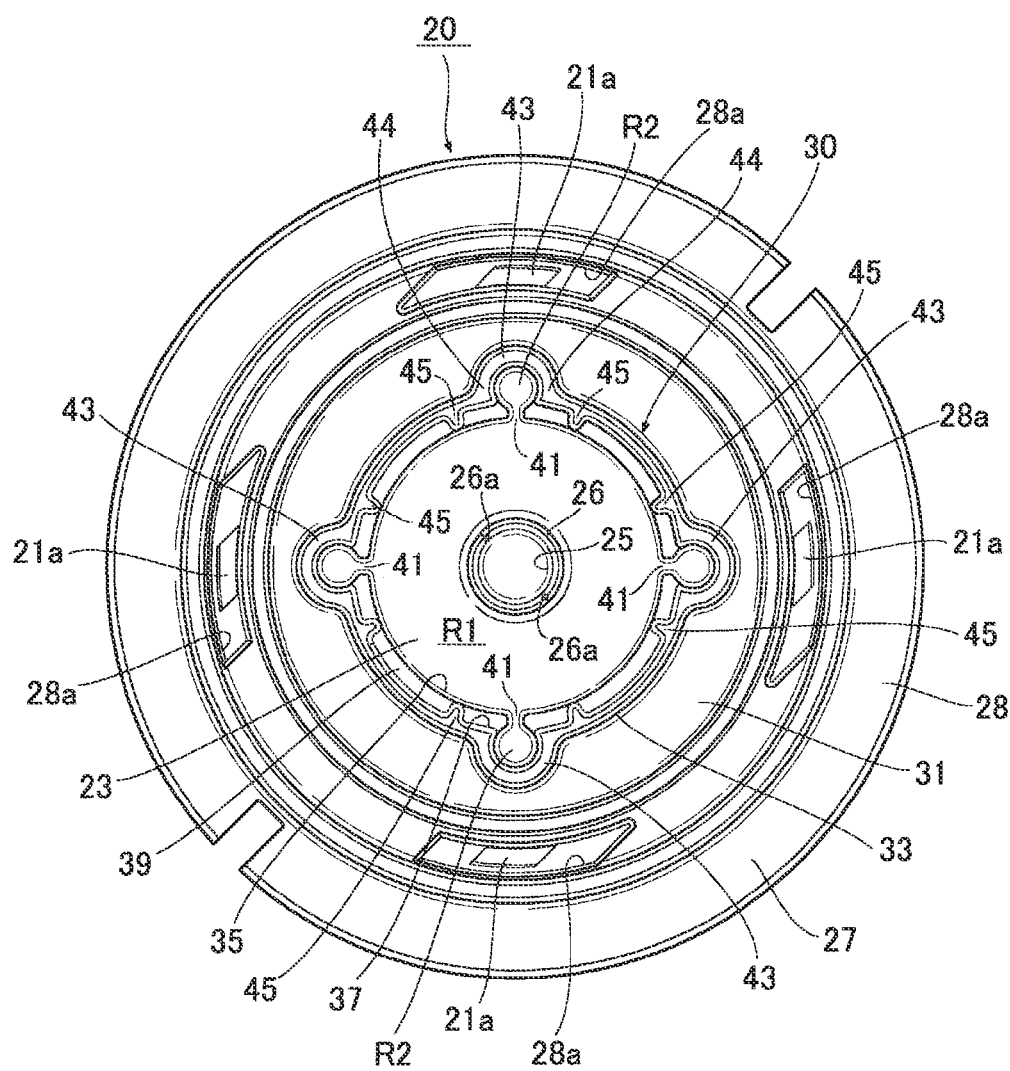
FIG. 5 is a plan view of the housing constituting the valve device.

As shown in FIG. 5, a pair of minute notches 26a, 26a are formed in the first valve seat 26 at positions facing each other in a radial direction. As shown in FIGS. 3 and 7, the pair of minute notches 26a, 26a prevents the valve hole 25 from being completely closed even when the back surface 91 of the adjusting valve 90 is in contact with the first valve seat 26.

Further, a second valve seat 27 is provided to protrude downward from a peripheral edge of the valve hole 25 on the valve chamber V side. The float valve 80 is brought into contact with and separated from the second valve seat 27 (in this case, the valve head 81 is brought into contact with and separated from the second valve seat 27) to close the valve hole 25.

An accommodation portion 30 that surrounds and accommodates the adjusting valve 90 is provided to protrude from an outer periphery of the first valve seat 26 on a surface (front surface) of the partition wall 23 on the ventilation chamber R side. As shown in FIGS. 3 to 6, the accommodation portion 30 according to this embodiment includes a base portion 31 having a substantially circular frame shape protruding by a predetermined height from the surface of the partition wall 23 on the ventilation chamber R side, and an extension wall 33 extending upward by a predetermined height from an inner peripheral edge of an upper end of the base portion 31.

Further, as shown in FIG. 5, when the accommodation portion 30 is viewed from the axial direction of the adjusting valve 90 (the direction along a direction in which the pressure adjusting valve moves up and down, and the direction matching the axial direction of the housing), as shown in FIG. 3, an accommodating space R1 for accommodating the adjusting valve 90 is formed on an inner side of the accommodation portion 30, and an outer space R2 is formed on an outer side of the accommodating space R1. In this embodiment, a tubular space formed inside a cover wall 43, which will be described later, forms the outer space R2.

As shown in FIGS. 6 to 8, the accommodating space R1 is a space surrounded by the front surface of the partition wall 23, an inner peripheral surface of the accommodation portion 30, and the back surface 91 of the adjusting valve 90.

Figure 4:
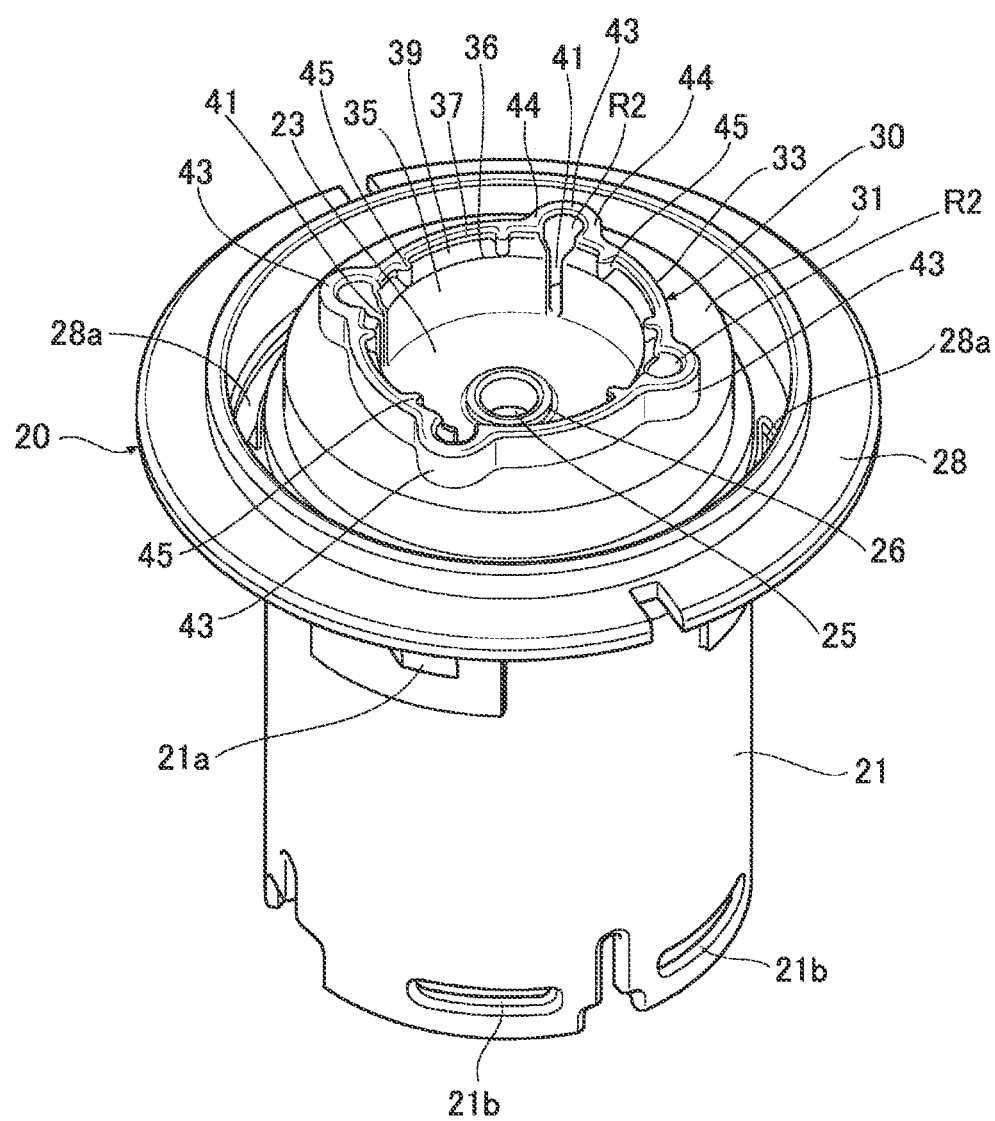
FIG. 4 is a perspective view of a housing constituting the valve device.

As shown in FIGS. 4 and 6, the inner periphery of the accommodation portion 30 is provided with a reduced diameter portion 35 positioned on the partition wall 23 side and having a shape adapted to the outer periphery of the adjusting valve 90, and an increased diameter portion 37 positioned above the reduced diameter portion 35 and having a shape larger in diameter than the outer periphery of the adjusting valve 90.

In this embodiment, the reduced diameter portion 35 has a circular inner peripheral surface corresponding to an outer peripheral shape (circular shape) of the adjusting valve 90 having a disk shape, and is formed to have a constant inner diameter along an axial direction C (see FIG. 3) of the housing 15 from the surface of the partition wall 23 on the ventilation chamber R side. A stepped portion 39 which is inclined such that the inner diameter of the accommodation portion gradually increases toward a direction away from the partition wall 23 is formed from an upper end 36 (see FIG. 4) of the reduced diameter portion 35 in the axial direction. The increased diameter portion 37 having a circular inner peripheral surface formed with a constant inner diameter is provided from an upper end of the stepped portion 39. That is, the increased diameter portion 37 is provided from the upper end 36 of the reduced diameter portion 35 via the stepped portion 39.

As shown in FIG. 7, a height H of the upper end 36 of the reduced diameter portion 35 from the surface (front surface) of the partition wall 23 on the ventilation chamber R side coincides with that of the front surface 92 of the adjusting valve 90 in a state where the adjusting valve 90 is in contact with the first valve seat 26 (that is, in a state where the back surface 91 of the adjusting valve 90 is in contact with the first valve seat 26). The height H of the upper end 36 of the reduced diameter portion 35 may be greater than or equal to that of the front surface 92 of the adjusting valve 90 in a state where the adjusting valve 90 is in contact with the first valve seat 26. Further, as shown in FIG. 8, the adjusting valve 90 is configured to be beyond the upper end 36 of the reduced diameter portion 35 when the adjusting valve 90 is raised to the maximum extent by the pressure increase in the fuel tank.

The accommodation portion 30 is formed with an opening 41 through which the accommodating space R1 and the outer spaces R2 communicate with each other. As shown in FIGS. 3 and 4, the opening 41 according to this embodiment has a slit shape extending in the axial direction C in a range from a lower end to an upper end of the accommodation portion 30. As shown in FIG. 5, in this embodiment, a plurality of openings 41 are formed at equal intervals in a peripheral direction of the accommodation portion 30 (four openings 41 are formed here).

Further, as shown in FIG. 4, an opening width of the slit shaped opening 41 is constant from a lower end of the reduced diameter portion 35 (the portion to come into contact with the front surface of the partition wall 23) forming the accommodation portion 30 to the middle of the stepped portion 39, and gradually expands from the middle of the stepped portion 39 toward the upper end of the accommodation portion. As shown in FIG. 5, an inner portion of the opening 41 in the radial direction of the accommodation portion 30 communicates with the accommodating space R1, an outer portion of the opening 41 in the radial direction of the accommodation portion 30 communicates with a tubular space that forms the outer space R2, and an upper portion of the opening 41 communicates with the ventilation chamber R as shown in FIG. 6.

As shown in FIG. 5, the cover wall 43 is disposed outside the accommodating space R1 and at a position facing the opening 41. Both ends 44, 44 of the cover wall 43 are connected to the accommodation portion 30 on both sides of the opening 41.

More specifically, as shown in FIGS. 4 and 5, the cover wall 43 according to this embodiment protrudes by a predetermined height from a position facing the opening 41 on an upper end surface of the base portion 31 positioned at a lower portion of the extension wall 33 so that an axial cross section forms a substantially arc shape, and both ends 44, 44 of the cover wall 43 are connected to both sides of the opening 41 on the outer periphery of the extending wall 33 forming the accommodation portion 30.

A tubular space is formed inside the cover wall 43, and the tubular space forms the outer space R2. The tubular space of this embodiment is a substantially cylindrical space whose diameter is larger than a constant width portion of the slit shaped opening 41, such that a part of the inner periphery thereof communicates with the accommodating space R1 through the narrow opening 41, and an upper part thereof is open to communicate with the ventilation chamber R.

Further, as shown in FIG. 4, the increased diameter portion 37 is provided with a plurality of ribs 45 extending from the stepped portion 39 in the axial direction of the increased diameter portion 37 and arranged at predetermined intervals in a peripheral direction of the increased diameter portion 37, and inner ends of the ribs 45 in the radial direction are formed at the same positions as the inner peripheral surface of the reduced diameter portion 35 when the accommodation portion 30 is viewed in the axial direction (see FIG. 5).

As shown in FIGS. 4 and 5, the ribs 45 of this embodiment extend with a constant width from the stepped portion 39 to an upper end of the increased diameter portion 37, and the inner ends of the ribs in the radial direction are rounded in an arc shape, and are arranged at equal intervals in the peripheral direction of the increased diameter portion 37. Here, as shown in FIG. 5, a pair of ribs 45, 45 are arranged on both sides of each opening 41 in the peripheral direction, and a total of eight ribs 45 are provided. Further, the arc-shaped end surface of the inner ends of each rib 45 in the radial direction is flush with the inner peripheral surface of the reduced diameter portion 35 (see FIG. 4). The plurality of ribs 45 guide the up and down operation of the pressure adjusting valve 90.

Further, as shown in FIGS. 3 and 7, a storage space R4 for storing the fuel flowed into the ventilation chamber R is formed between the outer periphery of the accommodation portion 30 and the inner periphery of the housing 15, and the upper end of the accommodation portion 30 is formed so as to be positioned below the fuel vapor discharge port 61a provided in the housing 15 and communicating with the outside of the fuel tank.

In this embodiment, the storage space R4 is defined by the upper surface of the base portion 31 forming the lower portion of the accommodation portion 30, the outer surface of the extension wall 33 including the cover wall 43, and the inner surface of the peripheral wall 61 of the cover 60 forming the housing 15, and the upper end of the extension wall 33 is positioned below the fuel vapor discharge port 61a. The storage space R4 temporarily stores the fuel flowed into the ventilation chamber R from the valve hole 25 at the time of fuel oscillation or the like, so that it is difficult for the fuel to flow out from the fuel vapor discharge port 61a.

The accommodation portion described above has the reduced diameter portion and the increased diameter portion, but these are not necessarily required, and the accommodation portion may have any shape as long as the pressure adjusting valve is surrounded. The accommodation portion 30 of this embodiment has a substantially circular frame shape as a whole, but the accommodation portion may have, for example, a polygonal frame shape such as a quadrangular shape, a pentagonal shape, or a hexagonal shape, a substantially elliptical frame shape, a substantially oval frame shape, or the like. The accommodation portion preferably has a shape conforming to the outer peripheral shape of the pressure adjusting valve.

In addition, in the case of the present embodiment, the opening through which the accommodating space communicates the outer space is formed in a slit shape, but the opening may be a circular or prismatic through hole that communicates the inside in the radial direction and the outside in the radial direction of the accommodation portion, and may be any opening as long as the accommodating space and the outer space can communicate with each other.

In addition, the shape of the valve device according to the present invention other than the accommodation portion and the opening of the housing is not limited to that in the above embodiment.

Next, operation and effects of the valve device 10 having the above configurations according to the present invention will be described.

As shown in FIG. 3, in a state where a fuel liquid level in the fuel tank 1 does not rise and the float valve 80 is not immersed in the fuel, the float valve 80 moves down in the valve chamber V, the valve head 81 separates from the second valve seat 27, and a lower opening of the valve hole 25 is opened. When the pressure in the fuel tank 1 is equal to or lower than a predetermined value, the adjusting valve 90 is urged by its own weight in a direction toward the first valve seat 26, the back surface 91 is in contact with the first valve seat 26, and an upper opening of the valve hole 25 is closed. At this time, since the valve hole 25 is not completely closed due to the minute notches 26a (see FIG. 5) provided in the first valve seat 26 even when the back surface 91 of the adjusting valve 90 is in contact with the first valve seat 26, the valve chamber V and the ventilation chamber R communicate with each other via the valve hole 25 in the state shown in FIG. 3.

In the state shown in FIG. 3, when a vehicle turns in a curve, travels on a road, a slope, or the like having unevenness, or falls down due to an accident, the fuel in the fuel tank 1 oscillates violently and the fuel liquid level rises, the float valve 80 rises due to the urging force of the urging spring 95 and the buoyancy of the float valve 80 itself, the valve head 81 comes into contact with the inner peripheral edge portion of the second valve seat 27, and the lower opening of the valve hole 25 is closed, so that the fuel is prevented from flowing into the ventilation chamber R through the valve hole 25, and the fuel can be prevented from leaking to the outside of the fuel tank 1.

When the fuel vapor increases in the fuel tank 1 and the pressure in the fuel tank 1 increases due to traveling of the vehicle or the like, a fluid such as the fuel vapor passes through the through hole 71 of the cap 70, the valve chamber V. and the valve hole 25, and is likely to flow into the ventilation chamber R from the upper opening of the valve hole 25 (here, is likely to flow into the accommodating space R1 inside the accommodation portion 30). Then, since the fluid presses the back surface 91 of the pressure adjusting valve 90 that is in contact with the first valve seat 26, as shown in FIG. 8, the adjusting valve 90 is pushed up and is raised to the maximum (fully stroked) until the adjusting valve 90 comes into contact with the position regulating portion 69.

At this time, in the present embodiment, the reduced diameter portion 35 having a shape conforming to the outer periphery of the pressure adjusting valve is provided on the inner periphery of the accommodation portion 30, and the height of the upper end 36 of the reduced diameter portion 35 coincides with that of the front surface 92 of the adjusting valve 90 in a state where the adjusting valve 90 is in contact with the first valve seat 26. Therefore, as described above, when the internal pressure of the fuel tank increases, the fluid flowed into the accommodating space R1 inside the accommodation portion 30 from the valve hole 25 is prevented from flowing out of the accommodating space R1 of the accommodation portion 30, so that the pushing force by the fluid is easily applied to the back surface 91 of the adjusting valve 90, and the adjusting valve 90 can be reliably raised to the maximum rising position (can be fully stroked).

On the other hand, when the pressure in the fuel tank 1 decreases, the adjusting valve 90 tends to move down in a direction approaching the first valve seat 26 by its own weight. However, since the adjusting valve 90 is pushed up by the fluid flowing into the accommodating space R1 from the valve hole 25, the adjusting valve 90 is less likely to move down without any contrivance.

At this time, since the accommodation portion 30 is formed with the opening 41 through which the accommodating space R1 and the outer space R2 communicate with each other, when the internal pressure of the fuel tank decreases, the fluid such as the fuel vapor is easily released from the accommodating space R1 to the outer space R2 through the opening 41. As a result, the valve closing pressure of the adjusting valve 90 (the pressure when the raised adjusting valve 90 moves down and comes into contact with the first valve seat 26 to close the valve hole 25 again) can be increased (can be made higher). Therefore, a difference between a valve opening pressure and the valve closing pressure can be reduced, and the adjusting valve 90 can be easily closed even when the pressure in the fuel tank 1 is high.

In this way, in the valve device 10, when the pressure in the fuel tank 1 decreases, the adjusting valve 90 can be smoothly lowered, and the valve hole 25 can be easily closed. In addition, unlike the check valve in the valve device of Patent Literature 1, it is not necessary to form a hole for increasing the valve closing pressure of the adjusting valve 90 in the adjusting valve itself, so that the manufacturing cost of the valve device 10 can be reduced. In particular, in a case where the adjusting valve 90 is formed of a metal material such as stainless steel, it is not necessary to separately drill a through hole or the like with a drilling machine or the like, and the manufacturing cost can be reduced.

As shown in FIG. 3, the opening 41 according to the present embodiment has a slit shape extending in the axial direction C in a range from a lower end to an upper end of the accommodation portion 30. Therefore, the fluid flowed into the accommodating space R1 from the valve hole 25 is easily released to the outer space R2 from the slit shaped opening 41 without being affected by a stroke position of the adjusting valve 90 when the adjusting valve 90 is raised, and the valve closing pressure of the adjusting valve 90 can be more reliably increased.

As described above, when the pressure in the fuel tank 1 increases, the adjusting valve 90 is pushed up by a fluid such as fuel vapor flowed into the accommodating space R1 from the valve hole 25. At this time, in the present embodiment, as shown in FIG. 5, the cover wall 43 is disposed outside the accommodating space R1 and at the position facing the opening 41.

As shown in FIGS. 4 and 5, both ends 44, 44 of the cover wall 43 are connected to the accommodation portion 30 on both sides of the opening 41, and the tubular space is formed inside the cover wall 43, the tubular space forming the outer space R2.

Therefore, when the pressure in the fuel tank 1 decreases, the fluid flowed into the accommodating space R1 from the valve hole 25 is easily released from the accommodating space R1 to the tubular space forming the outer space R2. In addition, since both ends 44, 44 of the cover wall 43 are connected to the accommodation portion 30 on both sides of the opening 41, deformation of the accommodation portion 30 toward the inner side in the radial direction can be suppressed at the time of molding the housing. Therefore, the accuracy of the width dimension of the opening 41 can be maintained, the accommodation portion 30 is suppressed from interfering with the adjusting valve 90, and the up and down operation of the adjusting valve 90 is not hindered. Further, both ends 44, 44 of the cover wall 43 are connected to both sides of the opening 41, and the opening 41 is surrounded by the cover wall 43, so that when the pressure in the fuel tank 1 increases, a fluid such as fuel vapor flowed into the accommodating space R1 from the valve hole 25 can be unlikely to flow out from the accommodating space R1 to the outer space R2, the pushing force of the adjusting valve 90 by the fluid can be easily maintained, and the adjusting valve 90 can be raised easily.

The present invention is not limited to the embodiment described above, and various modifications can be made without departing from the gist of the present invention, and such embodiments are also included in the scope of the present invention.

EXAMPLE

In a case where the accommodation portion is provided with the opening, it was tested how much the valve closing pressure of the pressure adjusting valve increases when the pressure in the fuel tank decreases.

Example

A valve device according to Example provided with a housing, an accommodation portion, and an opening similar to those of the valve device shown in FIGS. 1 to 8 was manufactured. Further, the pressure adjusting valve is not formed with a through hole.

Comparative Example 1

A valve device according to Comparative Example 1 was manufactured in the same manner as in Example except that the accommodation portion was not provided. The pressure adjusting valve is not formed with a through hole as in the Example.

Comparative Example 2

A valve device according to Comparative Example 2 was manufactured in the same manner as in Comparative Example 1 except that four through holes were formed in the pressure adjusting valve.

(Test Method)

The valve devices according to the above Example and Comparative Examples 1 and 2 were set in a fuel tank, air was blown into the fuel tank from an air supply pipe (not shown) at a predetermined flow rate, and then, internal pressure of the fuel tank was lowered by controlling with an adjusting valve. At this time, the behavior of the pressure adjusting valve in the valve device according to each of Example and Comparative Examples 1 and 2, that is, the fluctuation of tank internal pressure when the pressure adjusting valve was raised by blowing air, and the fluctuation of the tank internal pressure when the pressure adjusting valve was lowered by stopping blowing air, were measured.

Figure 9:
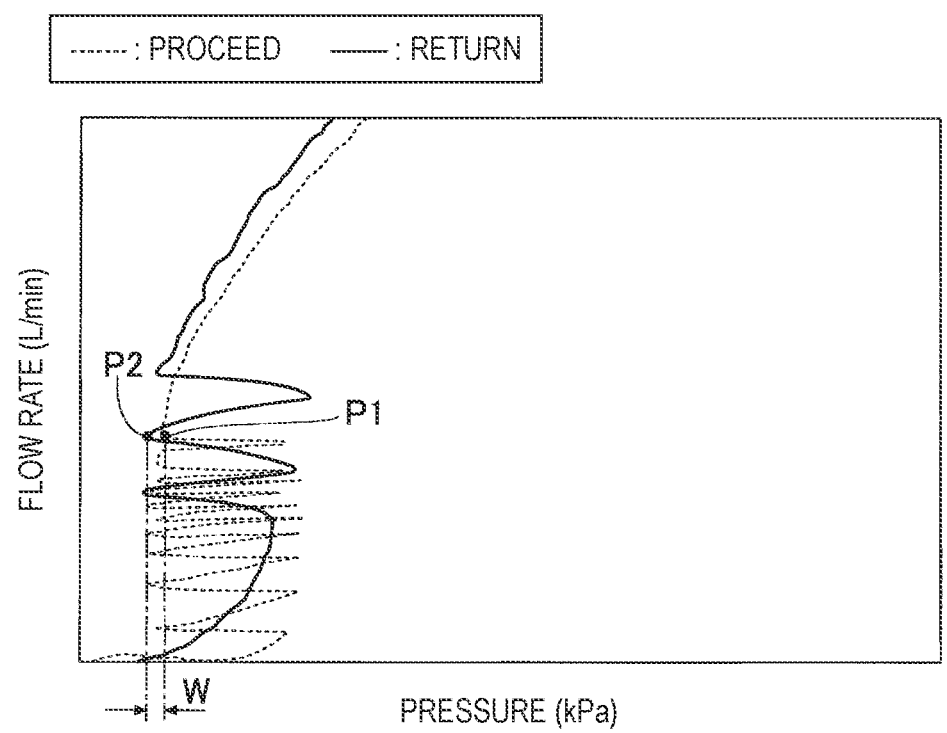
FIG. 9 is a graph showing a relationship between pressure and a flow rate in a test result of Example.
Figure 10A:
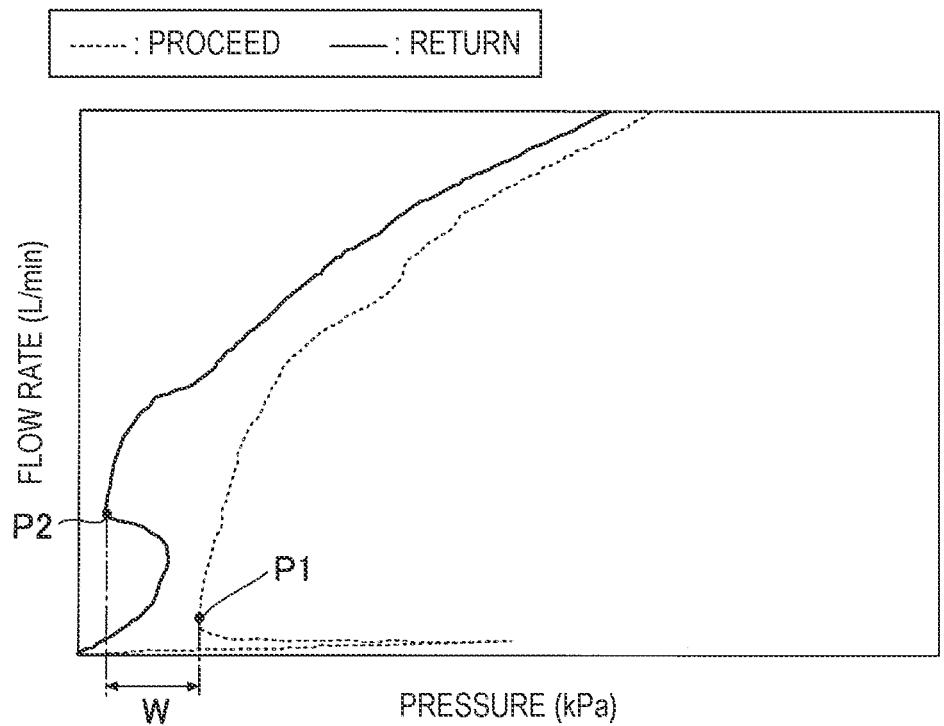
FIG. 10A is a graph showing the relationship between the pressure and the flow rate in a test result of Comparative Example 1.
Figure 10B:
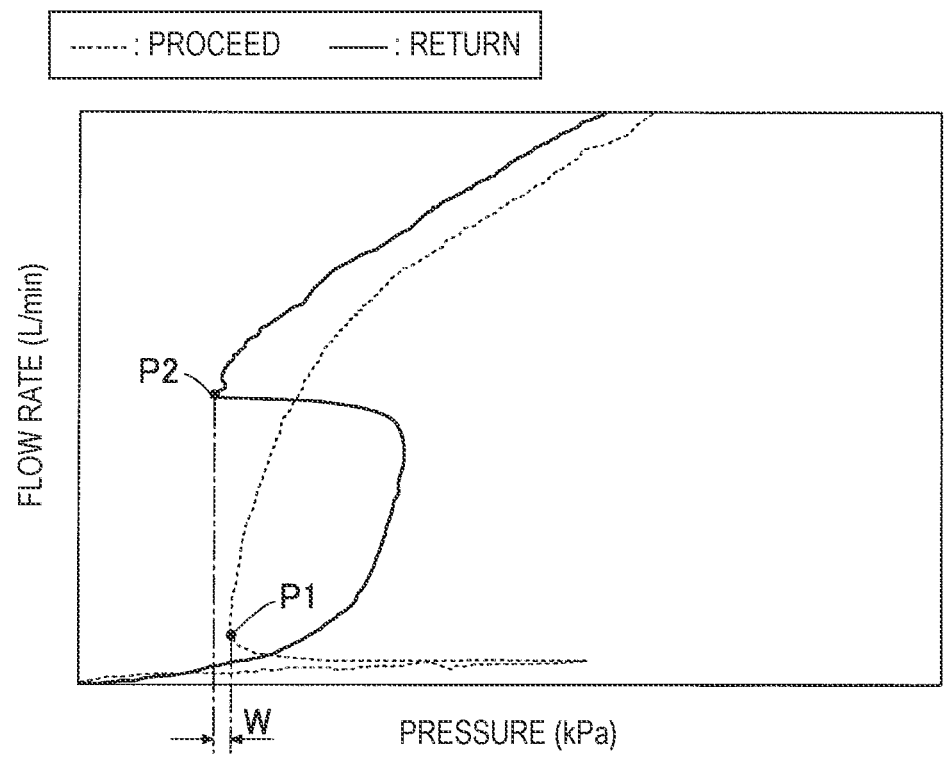
FIG. 10B is a graph showing the relationship between the pressure and the flow rate in a test result of Comparative Example 2.

The results are shown in FIGS. 9, 10A and 10B. FIG. 9 is a graph showing a relationship between the pressure and the flow rate in Example, FIG. 10A is a graph showing the relationship between the pressure and the flow rate in Comparative Example 1, and FIG. 10B is a graph showing the relationship between the pressure and the flow rate in Comparative Example 2.

In each table, a broken line (the line marked "proceed") indicates a state when air is blown in and the pressure adjusting valve is raised (pressure fluctuation when the adjusting valve is raised), and a solid line (a line marked "return") indicates a state when the air blowing is stopped and the pressure adjusting valve is lowered (pressure fluctuation when the adjusting valve is lowered). In each broken line, a point P1 where the pressure decreases beyond the peak of the pressure (the bending point on the right side of the graph) is a point when the pressure adjusting valve is separated from the first valve seat (since the valve hole is opened, the pressure decreases). Further, in each solid line, a point P2 where the gradually decreasing pressure starts to increase is a point when the pressure adjusting valve comes into contact with the first valve seat (since the valve hole is closed, the pressure increases). The smaller a distance W (hysteresis) between the points P1 and P2 is, the easier the pressure adjusting valve is lowered (the better the responsiveness is) when the tank internal pressure is low, and the higher the valve closing pressure is.

As shown in FIG. 10A, in the case of Comparative Example 1 having the pressure adjusting valve in which the through hole is not formed, W is large and the valve closing pressure is small. On the other hand, as shown in FIG. 10B, in the case of Comparative Example 2 having the pressure adjusting valve in which the through hole is formed, W is small and the valve closing pressure is high. However, in the case of Comparative Example 2, since the through hole is formed in the pressure adjusting valve, the manufacturing cost is high.

In contrast, as shown in FIG. 9, in the case of Example, the W was small, and the valve closing pressure is increased as in the case of Comparative Example 2, and the effect of providing the opening was confirmed. That is, in the case of Embodiment, the valve closing pressure can be increased, and since the through hole is not formed in the pressure adjusting valve itself, the manufacturing cost of the entire valve device can be reduced.

REFERENCE SIGNS LIST

1 fuel tank
10 valve device
15 housing
20 housing main body
23 partition wall
25 valve hole
26 first valve seat
27 second valve seat
30 accommodation portion
41 opening
43 cover wall
44, 44 both ends
60 cover
70 cap
80 float valve
90 pressure adjusting valve (adjusting valve)
91 back surface
92 front surface
95 urging spring
97 seal ring
R ventilation chamber
R1 accommodating space
R2 outer space
V valve chamber

The invention claimed is:

1. A valve device comprising:
a housing in which a valve chamber is provided on a lower side and a ventilation chamber is provided on an upper side via a partition wall, the valve chamber communicating with an inside of a fuel tank, the ventilation chamber communicating with an outside of the fuel tank, and the partition wall being formed with a valve hole through which the valve chamber and the ventilation chamber communicate with each other;
a float valve accommodated in the valve chamber so as to be movable up and down and configured to open and close the valve hole; and
a pressure adjusting valve configured to adjust pressure and accommodated in the ventilation chamber so as to be movable up and down,
wherein a first valve seat which the pressure adjusting valve is to come into contact with and is to separate from is formed from a peripheral edge of the valve hole on a side of the ventilation chamber, and a second valve seat which the float valve is to come into contact with and is to separate from is formed from a peripheral edge of the valve hole on a side of the valve chamber,
wherein an accommodation portion is provided in a protruding manner from a surface of the partition wall on the side of the ventilation chamber,
wherein when the accommodation portion is viewed from an axial direction of the pressure adjusting valve, an accommodating space configured to accommodate the pressure adjusting valve is formed on an inner side of the accommodation portion, and an outer space is formed on an outer side of the accommodating space,
wherein the accommodation portion is formed with an opening through which the accommodating space and the outer space communicate with each other,
wherein the opening has a slit shape extending in the axial direction in a range from a lower end to an upper end of the accommodation portion, and
wherein the opening having the slit shape has a shape which gradually expands from a lower end side to the upper end of the accommodation portion.

2. A valve device comprising:
a housing in which a valve chamber is provided on a lower side and a ventilation chamber is provided on an upper side via a partition wall, the valve chamber communicating with an inside of a fuel tank, the ventilation chamber communicating with an outside of the fuel tank, and the partition wall being formed with a valve hole through which the valve chamber and the ventilation chamber communicate with each other;

a float valve accommodated in the valve chamber so as to be movable up and down and configured to open and close the valve hole; and a pressure adjusting valve configured to adjust pressure and accommodated in the ventilation chamber so as to be movable up and down, wherein a first valve seat which the pressure adjusting valve is to come into contact with and is to separate from is formed from a peripheral edge of the valve hole on a side of the ventilation chamber, and a second valve seat which the float valve is to come into contact with and is to separate from is formed from a peripheral edge of the valve hole on a side of the valve chamber, wherein an accommodation portion is provided in a protruding manner from a surface of the partition wall on the side of the ventilation chamber, wherein when the accommodation portion is viewed from an axial direction of the pressure adjusting valve, an accommodating space configured to accommodate the pressure adjusting valve is formed on an inner side of the accommodation portion, and an outer space is formed on an outer side of the accommodating space, wherein the accommodation portion is formed with an opening through which the accommodating space and the outer space communicate with each other, wherein a cover wall is disposed outside the accommodating space at a position facing the opening, and both ends of the cover wall are connected to the accommodation portion on both sides of the opening, and wherein when viewed from the axial direction of the pressure adjusting valve, the cover wall protrudes outward with respect to the accommodation portion.

* * * * *